United States Patent
Odagiri et al.

(10) Patent No.: US 10,726,575 B2
(45) Date of Patent: Jul. 28, 2020

(54) INFORMATION PROCESSING APPARATUS, RECORDING MEDIUM RECORDING LINE-OF-SIGHT DETECTION PROGRAM, AND LINE-OF-SIGHT DETECTION METHOD

(71) Applicant: FUJITSU LIMITED, Kawasaki-shi, Kanagawa (JP)

(72) Inventors: Junichi Odagiri, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 16/145,728

(22) Filed: Sep. 28, 2018

(65) Prior Publication Data

US 2019/0102904 A1    Apr. 4, 2019

(30) Foreign Application Priority Data

Oct. 2, 2017    (JP) ................... 2017-192602

(51) Int. Cl.
    *G06T 7/73*     (2017.01)
    *G06K 9/00*     (2006.01)
    *G06F 3/01*     (2006.01)

(52) U.S. Cl.
    CPC .............. *G06T 7/73* (2017.01); *G06K 9/0061* (2013.01); *G06K 9/00597* (2013.01); *G06F 3/013* (2013.01); *G06T 2207/10016* (2013.01); *G06T 2207/30201* (2013.01)

(58) Field of Classification Search
    CPC .... G06T 7/73; G06K 9/00597; G06K 9/0061; G06F 3/013
    See application file for complete search history.

(56) References Cited

U.S. PATENT DOCUMENTS

| | | | | |
|---|---|---|---|---|
| 9,940,518 | B1* | 4/2018 | Klingstrom | G06K 9/2054 |
| 2010/0201621 | A1 | 8/2010 | Niikawa | |
| 2012/0056872 | A1* | 3/2012 | Kim | H04N 13/302 345/419 |
| 2016/0007016 | A1* | 1/2016 | Holliman | H04N 13/128 348/54 |

(Continued)

FOREIGN PATENT DOCUMENTS

| | | |
|---|---|---|
| JP | 07-308290 | 11/1995 |
| JP | 10-276987 | 10/1998 |
| WO | 2009/019760 | 2/2009 |

OTHER PUBLICATIONS

Gu Li Gang et al., "Studies on the evaluation of Visual fatigue in VDT work by involuntary eye movement (flick)", Ergonomics, vol. 32, No. 2, pp. 87-97, 1996 (11 pages), with English Abstract.

*Primary Examiner* — David F Dunphy
(74) *Attorney, Agent, or Firm* — Fujitsu Patent Center

(57) ABSTRACT

A non-transitory computer-readable recording medium having stored therein a line of sight detection program for causing a computer to execute a process, the process includes finding an index indicating a variation of a line of sight of an observer who observes an object based on a difference between line of sight data of a left eye of the observer and line of sight data of a right eye of the observer, determining a stay of the line of sight of the observer based on the index, and resolving a line of sight position of the observer based on a result of the determination on the stay.

15 Claims, 11 Drawing Sheets

(56) References Cited

U.S. PATENT DOCUMENTS

| | | | | |
|---|---|---|---|---|
| 2017/0285337 | A1* | 10/2017 | Wilson | G02B 27/01 |
| 2017/0360295 | A1* | 12/2017 | Oz | G06K 9/3233 |
| 2018/0059420 | A1* | 3/2018 | Woo | G02B 27/0172 |
| 2019/0073793 | A1* | 3/2019 | Jeon | G06F 3/013 |
| 2019/0209005 | A1* | 7/2019 | Barraza-Bernal | A61B 3/085 |

* cited by examiner

INFORMATION PROCESSING APPARATUS, RECORDING MEDIUM RECORDING LINE-OF-SIGHT DETECTION PROGRAM, AND LINE-OF-SIGHT DETECTION METHOD

CROSS-REFERENCE TO RELATED APPLICATION

This application is based upon and claims the benefit of priority of the prior Japanese Patent Application No. 2017-192602, filed on Oct. 2, 2017, the entire contents of which are incorporated herein by reference.

FIELD

The embodiments discussed herein are related to an information processing apparatus, a line-of-sight detection program, and a line-of-sight detection method.

BACKGROUND

The line-of-sight detection technology is a technology for specifying the place the observer observing the object is looking at and is used in various situations. For example, a screen of a personal computer (PC), a display shelf of a commodity at a store, or the like can be an observed object.

Related art is disclosed in International Publication Pamphlet No. WO 2009/019760, Japanese Laid-open Patent Publication No. 7-308290, or Gu Li Gang, Kazuyoshi Sakamoto, "Studies on the evaluation of Visual Fatigue in VDT work by involuntary eye movement (flick)", *Ergonomics*, Vol. 32, No. 2, pp. 87-97, 1996.

SUMMARY

According to an aspect of the embodiments, a non-transitory computer-readable recording medium having stored therein a line of sight detection program for causing a computer to execute a process, the process includes finding an index indicating a variation of a line of sight of an observer who observes an object based on a difference between line of sight data of a left eye of the observer and line of sight data of a right eye of the observer, determining a stay of the line of sight of the observer based on the index, and resolving a line of sight position of the observer based on a result of the determination on the stay.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, a pointing device causes, based on a line-of-sight input, a cursor to be displayed in correspondence with a gaze point of a user on a display. For example, a saccade component is removed from outputs of a binocular eye movement measurement sensor. For example, visual fatigue is evaluated based on involuntary eye movement.

When the stay of the line of sight of the user is determined, a precise determination result is not obtained in some cases.

Further, this may arise not only in the line of sight of the user looking at the PC screen but also in the case of detecting the line of sight of an observer observing another object.

For example, the line of sight of an observer observing an object may be detected accurately.

Hereinafter, embodiments will be described in detail with reference to the drawings.

Figure 1:
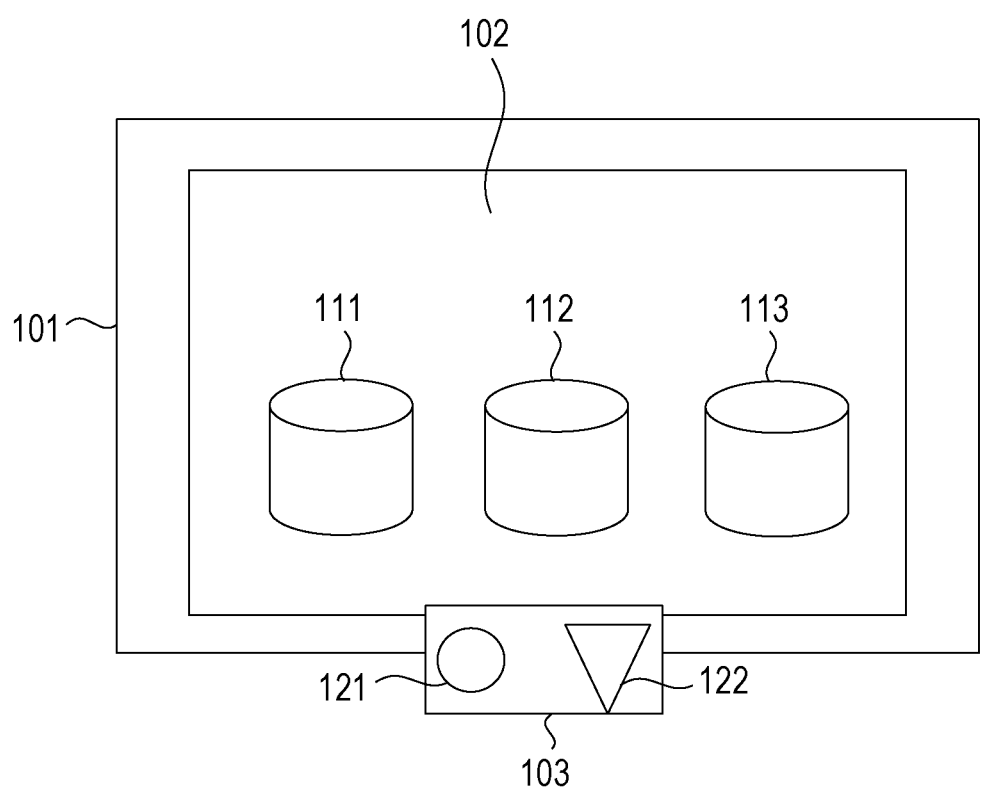
FIG. 1 is a diagram illustrating a line-of-sight sensor.

FIG. 1 illustrates an example of a line-of-sight sensor that detects a line of sight of a user observing a PC screen. Images 111 to 113 are displayed on a screen 102 of a display device 101 and a line-of-sight sensor 103 is provided at the bottom of the screen 102. The line-of-sight sensor 103 includes a light emitting diode (LED) 121 and a camera 122. At this time, the line-of-sight position of the user on the screen 102 sometimes moves between the images 111 to 113.

The LED 121 irradiates the face of the user looking at the screen 102 with an infrared ray and the camera 122 photographs the face of the user. A PC connected to the line-of-sight sensor 103 generates line-of-sight data indicating the line-of-sight position from a user's eye image photographed by the camera 122. The state indicated by the line-of-sight data generated from the eye image includes a large movement of a line of sight called a saccade, a stay where the line of sight rests at one place, and a line-of-sight variation called an involuntary eye movement.

Figure 2:
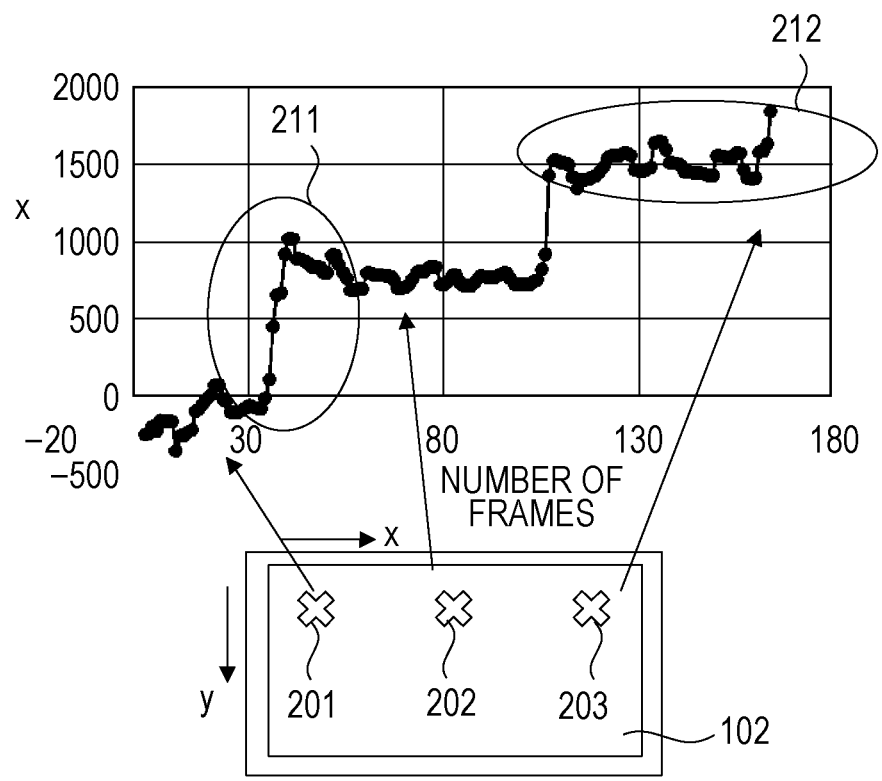
FIG. 2 is a diagram illustrating line-of-sight data indicating line-of-sight positions on a screen.

FIG. 2 illustrates an example of the line-of-sight data indicating line-of-sight positions on the screen 102. Assuming that the coordinate in a horizontal direction of the screen 102 is the x coordinate and the coordinate in a vertical direction is the y coordinate, the line-of-sight data can be represented by the coordinates (x, y) of the line-of-sight position of the user changing in time series. In the graph in FIG. 2, the abscissa axis represents the number of frames of a video photographed by the camera 122 and the ordinate axis represents the x coordinate of the line-of-sight position.

The line of sight stays around each of gaze positions 201 to 203 gazed by the user on the screen 102 and a saccade in which the line of sight abruptly moves occurs between two gaze positions. While the line of sight is staying, an involuntary eye movement in which the line-of-sight position varies is observed. The user recognizes an object while the line of sight is staying.

For example, a saccade between the gaze positions 201 and 202 appears as line-of-sight data 211 indicating a sharp increase in the x coordinate and an involuntary eye movement at the gaze position 203 appears as line-of-sight data 212 indicating minor increment and decrement in the x coordinate.

Figure 3:
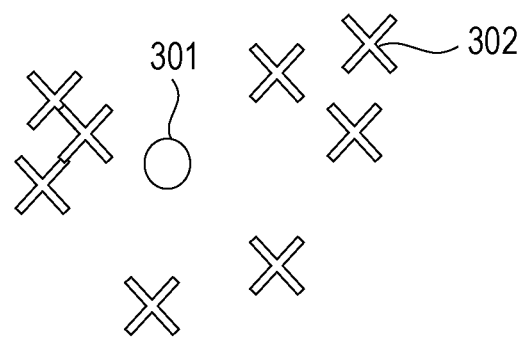
FIG. 3 is a diagram illustrating a detection result of the line-of-sight positions.

FIG. 3 illustrates an example of the detection result of the line-of-sight positions around the gaze position. When the user is gazing a gaze position 301, a detection result 302 of the line-of-sight position tends to vary around the gaze position 301 as a center. Possible causes of such variations include fine eyeball vibration, involuntary eye movement, detection error due to image processing or the like.

Among these causes, it is considered that the amplitude of the variation of the line-of-sight angle due to involuntary eye movement is approximately 0.8 degrees at the maximum and approximately 0.3 degrees on average. For example, Gu Li Gang, Sakamoto Kazuyoshi, "Studies on the evaluation of Visual Fatigue in VDT work by involuntary eye movement", *Ergonomics*, Vol. 32, No. 2, pp. 87-97, 1996 reports that the detection range of the amplitude of flicks included in involuntary eye movement is 3.0' to 50.0' and the average amplitude is 17.7'. Meanwhile, depending on the distance between the user and the camera 122 or the resolution of the image, the line-of-sight angle sometimes varies by several degrees or more.

An eye movement detection device of International Publication Pamphlet No. WO 2009/019760 calculates an enclosing circle having the smallest area that encloses a predetermined number of latest line-of-sight positions (smallest enclosing circle) and, in a case where a line-of-sight position detected next is enclosed in the smallest enclosing circle, determines that the eyeball of the user is stopped. With this process, even when the line-of-sight position slightly moves within the smallest enclosing circle or when there is a detection error of the line-of-sight angle, it can be found out that the user intentionally gazes at one point.

However, as described above, since not only involuntary eye movement but also a large movement of the line of sight are contained together in the line-of-sight data and the line-of-sight position changes also with a large movement of the line of sight, the latest smallest enclosing circle is not set in some cases.

Figure 4:
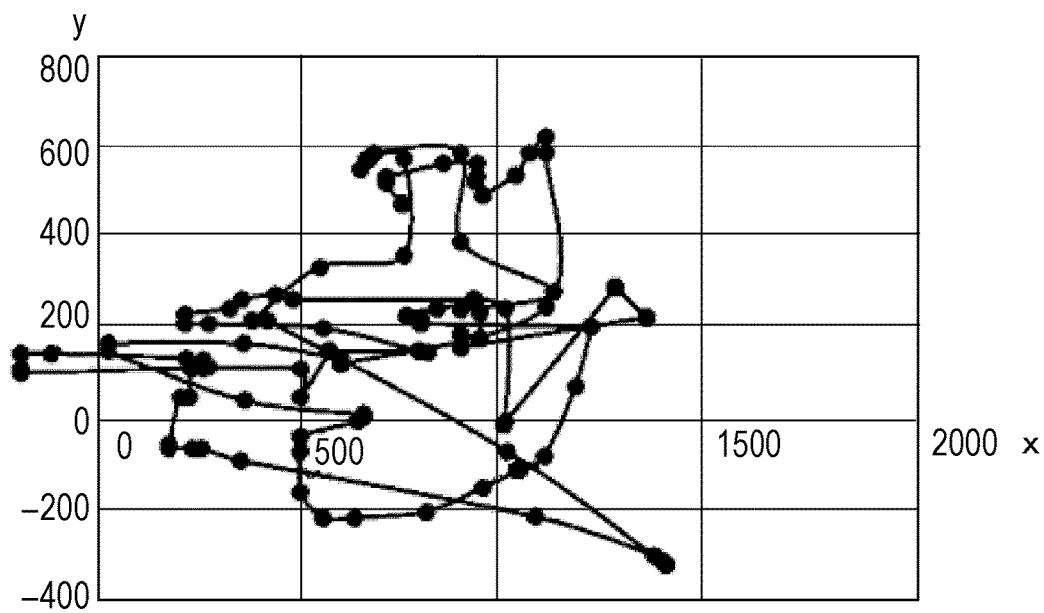
FIG. 4 is a diagram illustrating changes in line-of-sight position.

FIG. 4 illustrates an example of changes in the line-of-sight position on a PC screen. The abscissa axis and the ordinate axis represent the x coordinate and y coordinate of the screen, respectively. In the actual work using the PC, since the line-of-sight data includes a lot of large movement of the line of sight and the variation during the stay of the line of sight is unclear, it is difficult to set an appropriate smallest enclosing circle. When the stay of the line of sight is determined based on an inappropriate smallest enclosing circle, the accuracy of the determination result declines.

Furthermore, in an environment such as an embedded device installed on a commodity shelf, since the frame rate of the video of the camera 122 is relatively low, the number of samples of the line-of-sight position is small and it is difficult to statistically resolve the variation amount.

Figure 5:
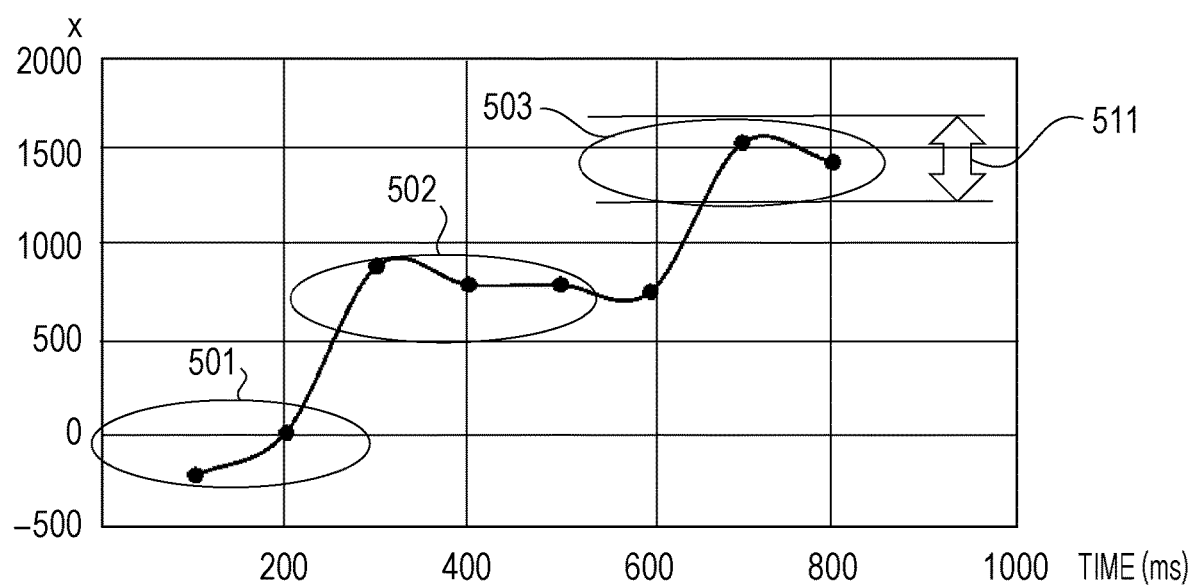
FIG. 5 is a diagram illustrating line-of-sight data generated from a low-rate video.

FIG. 5 illustrates an example of line-of-sight data generated from a low-rate video. The abscissa axis represents time and the ordinate axis represents the x coordinate of the line-of-sight position. The frame rate of the video is 100 ms/frame and line-of-sight data 501 to line-of-sight data 503 represent the line-of-sight positions of a staying line of sight.

Since the average gaze time of a human being is about several hundred milliseconds, in the case of 100 ms/frame, about several line-of-sight positions are only generated for one stay place. In this case, if the variation amount is resolved using about ten line-of-sight positions, a large movement of the line of sight is mixed and the accuracy of the variation amount declines. In the example in FIG. 5, if the variation amount is resolved using all of the line-of-sight data 501 to the line-of-sight data 503, the large movement of the line of sight is mixed.

Therefore, a conceivable method is to resolve in advance a range 511 of variations in the line-of-sight position and determine that the line of sight is staying in a case where the line-of-sight data is included in the range 511. However, the actual variation fluctuates depending on the conditions such as the distance between the user and the camera or the individual difference of the eyeball of the user. Accordingly, if the stay is determined based on the range 511 resolved in advance, a precise determination result is not obtained in some cases.

Figure 6B:
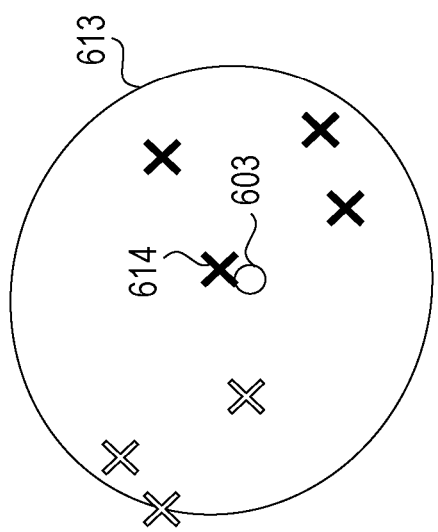
FIGS. 6A and 6B are diagrams illustrating relationships between the number of samples of the line-of-sight position and smallest enclosing circles.
Figure 6A:
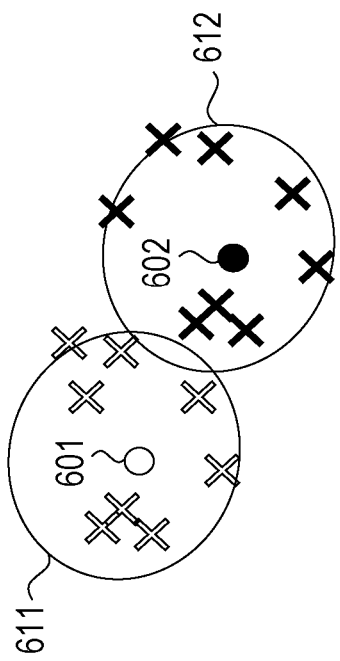

FIGS. 6A and 6B illustrate relationships between the number of samples of the line-of-sight position and the smallest enclosing circles. In the detection result in FIG. 6A, since the number of samples is large, it is possible to clearly distinguish between a smallest enclosing circle 611 with respect to a gaze position 601 and a smallest enclosing circle 612 with respect to a gaze position 602. Accordingly, the stay of the line of sight may be accurately determined based on the smallest enclosing circles 611 and 612.

On the other hand, in the detection result in FIG. 6B, since the number of samples is small, a line-of-sight position 614 when another gaze position is looked at is contained together within a smallest enclosing circle 613 with respect to a gaze position 603. For this reason, it is difficult to determine the stay using the smallest enclosing circle 613 and the accuracy of the determination on the stay declines.

Figure 7:
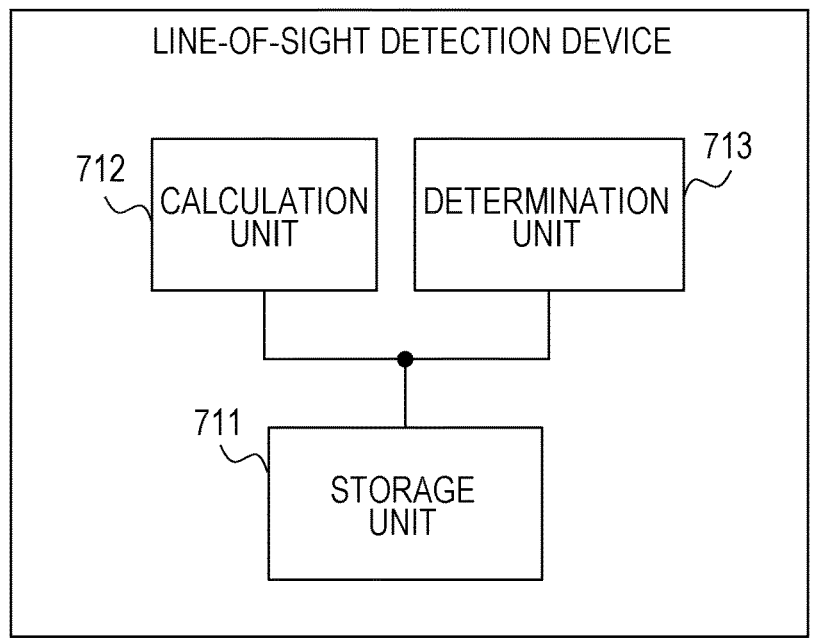
FIG. 7 is a functional configuration diagram of a line-of-sight detection device.

FIG. 7 illustrates a functional configuration example of a line-of-sight detection device according to the embodiment. The line-of-sight detection device 701 in FIG. 7 includes a storage unit 711, a calculation unit 712, and a determination unit 713. The storage unit 711 stores line-of-sight data of the left eye of an observer observing an object and line-of-sight data of the right eye of the observer. The calculation unit 712 and the determination unit 713 perform a line-of-sight detection process using the line-of-sight data stored in the storage unit 711.

Figure 8:
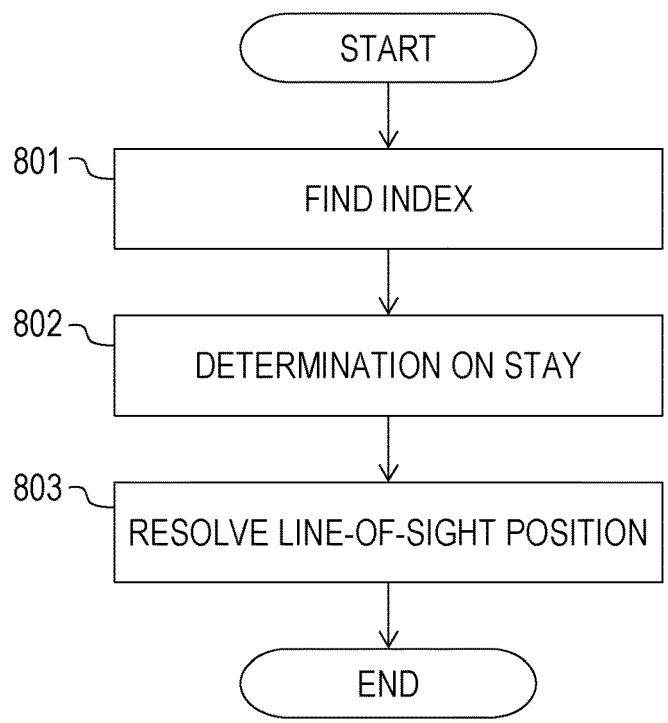
FIG. 8 is a flowchart of a line-of-sight detection process.

FIG. 8 is a flowchart illustrating an example of the line-of-sight detection process performed by the line-of-sight detection device 701 in FIG. 7. First, the calculation unit 712 finds an index indicating the variation of the line of sight of the observer based on a difference between the line-of-sight data of the left eye and the line-of-sight data of the right eye (step 801). Next, based on the index calculated by the calculation unit 712, the determination unit 713 determines the stay of the observer's line of sight (step 802) and resolves the line-of-sight position of the observer based on the result of the determination on the stay (Step 803).

According to the line-of-sight detection device 701 in FIG. 7, the line of sight of the observer observing the object may be accurately detected.

Figure 9:
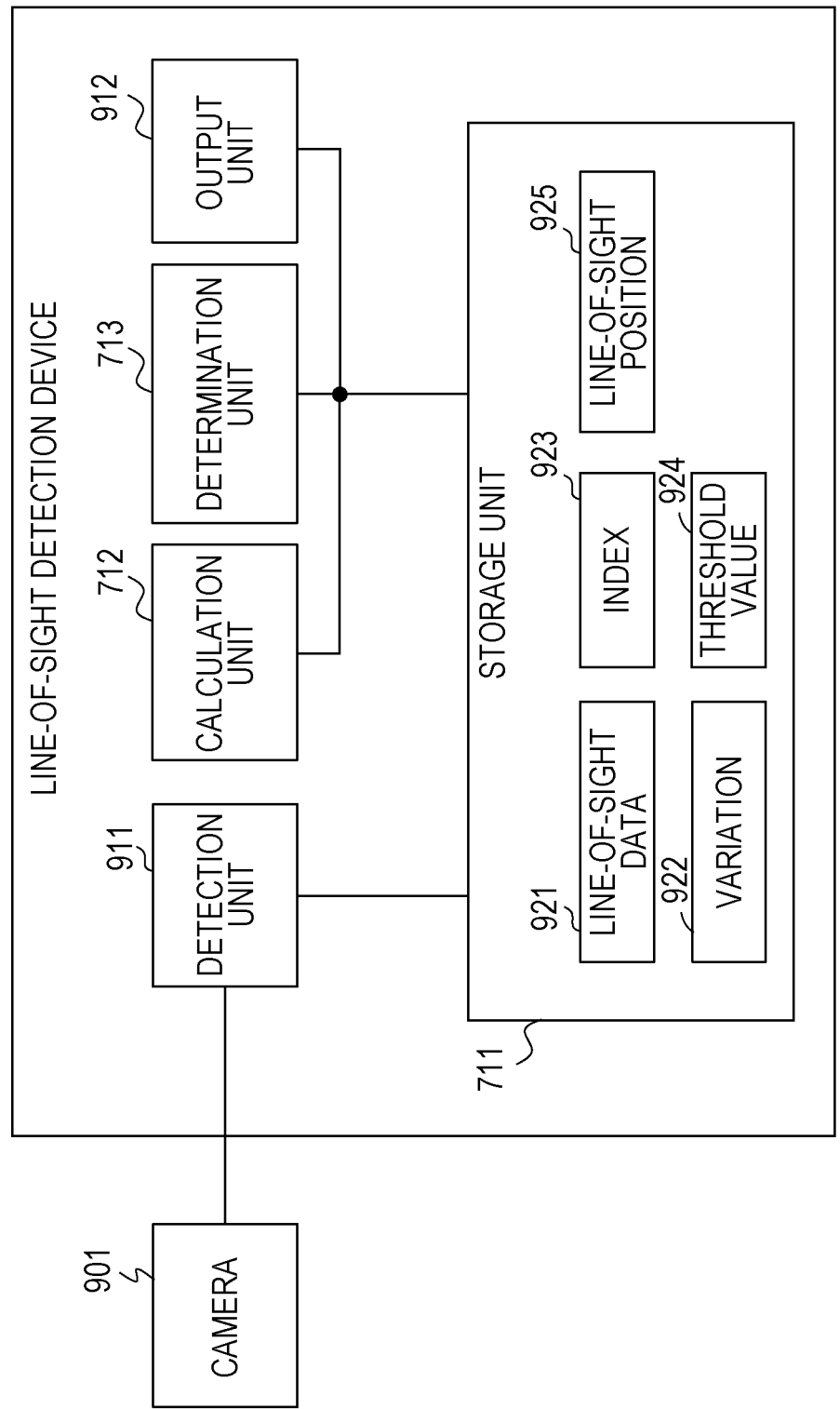
FIG. 9 is a functional configuration diagram illustrating a specific example of the line-of-sight detection device.

FIG. 9 illustrates a specific example of the line-of-sight detection device 701 in FIG. 7. The line-of-sight detection device 701 in FIG. 9 includes the storage unit 711, the calculation unit 712, the determination unit 713, a detection unit 911, and an output unit 912. For example, a camera 901 corresponds to the camera 122 in FIG. 1 and photographs the face of the observer to output a video to the line-of-sight detection device 701. The detection unit 911 detects line-of-sight data 921 of the left eye and the right eye of the observer from each of images at a plurality of time points included in the video output by the camera 122 and saves the line-of-sight data 921 in the storage unit 711. The image at each time point is sometimes called a frame.

For example, the line-of-sight data 921 indicates line-of-sight positions of the left eye and the right eye in a plane opposing the face of the observer. In the case of the display device 101 in FIG. 1, the screen 102 corresponds to the plane opposing the face of the observer. In addition, when the camera 901 is installed on a commodity shelf, a virtual plane covering the front surface of the commodity shelf corresponds to the plane opposing the face of the observer.

Figure 10:
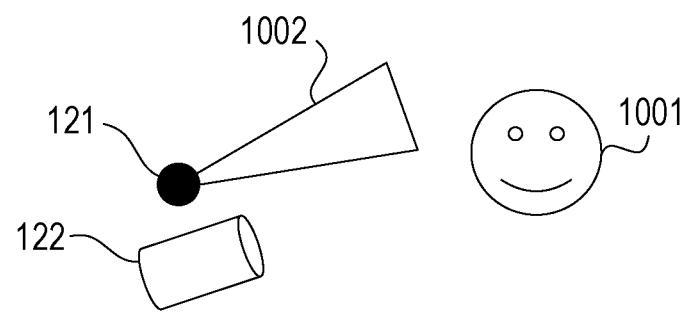
FIG. 10 is a diagram illustrating line-of-sight detection by the line-of-sight sensor.

FIG. 10 illustrates an example of line-of-sight detection by the line-of-sight sensor 103 in FIG. 1. The LED 121 irradiates the face 1001 of the observer looking at the screen 102 with an infrared ray 1002 and the camera 122 photographs the face 1001. In this case, the detection unit 911 calculates the line-of-sight position of the observer based on a positional relationship between the coordinates of the pupil and the coordinates of the corneal reflection captured in the image by a corneal reflection method.

When the observer is looking at the line-of-sight sensor 103, a difference between the coordinates of the pupil (PupX, PupY) and the coordinates of the corneal reflection (PrkX, PrkY) becomes zero and, when the observer is looking at a position away from the line-of-sight sensor 103, a difference between those coordinates is produced. Therefore, in the corneal reflection method, the direction of the line of sight is detected from the difference between the coordinates (PupX, PupY) and the coordinates (PrkX, PrkY). A line-of-sight position of one eye detected from an i-th frame by the corneal reflection method is represented by coordinates (Xi, Yi) on the screen 102 and can be found by the following formula.

$$Xi = A*(PupX - PrkX) + W/2 \quad (1)$$

$$Yi = H + B*(PupY - PrkY) \quad (2)$$

W in formula (1) represents the number of pixels of the screen 102 in the horizontal direction and H in formula (2) represents the number of pixels of the screen 102 in the vertical direction. The coefficients A and B are found in advance by calibration. Further, the line-of-sight position (Xi, Yi) can also be calculated from a line-of-sight vector.

The calculation unit 712 calculates an index 923 indicating the variation of the line of sight based on a difference between the line-of-sight data 921 of the left eye and the line-of-sight data 921 of the right eye and saves the calculated index 923 in the storage unit 711. The determination unit 713 calculates a threshold value 924 for the determination on the stay based on the index 923 and saves the calculated threshold value 924 in the storage unit 711. The determination unit 713 also calculates a variation 922 of the line-of-sight data at each of the plurality of time points within a predetermined period, from the line-of-sight data 921 of the left eye and the right eye detected at each time point and saves the calculated variation 922 in the storage unit 711.

Next, the determination unit 713 determines the stay for the variation 922 and determines that the line of sight of the observer is staying when the variation 922 at each time point within the predetermined period is smaller than the threshold value 924. Then, the determination unit 713 resolves a line-of-sight position 925 of the observer based on the result of the determination on the stay and the output unit 912 outputs the line-of-sight position 925.

By calculating the difference between the line-of-sight data 921 of the left eye and the line-of-sight data 921 of the right eye, a saccade included in the line-of-sight data 921 of each eye is canceled and it becomes easier to extract the variation representing involuntary eye movement. When the observer is looking at an object such as the screen 102, since both eyes are gazing at the same position, the gaze positions of both eyes are considered to be the same except for a difference in the variation. At this time, a difference in the line-of-sight data 921 between both eyes in a left-right direction (horizontal direction) is affected by congestion, but a difference in the vertical direction is not affected by congestion.

Figure 11:
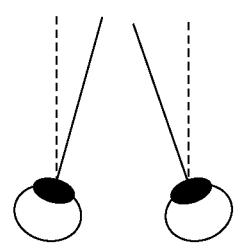
FIG. 11 is a diagram illustrating congestion.

FIG. 11 illustrates an example of congestion. Congestion represents the movement of the eyeballs in which both eyes simultaneously point inward when the observer gazes at an object. When the object moves forward or backward, congestion occurs with the focus adjustment on the object. Since the eyeballs move in the left-right direction due to congestion but do not move in an up-down direction, a difference in the line-of-sight data 921 in the vertical direction is not affected by congestion.

Figure 12:
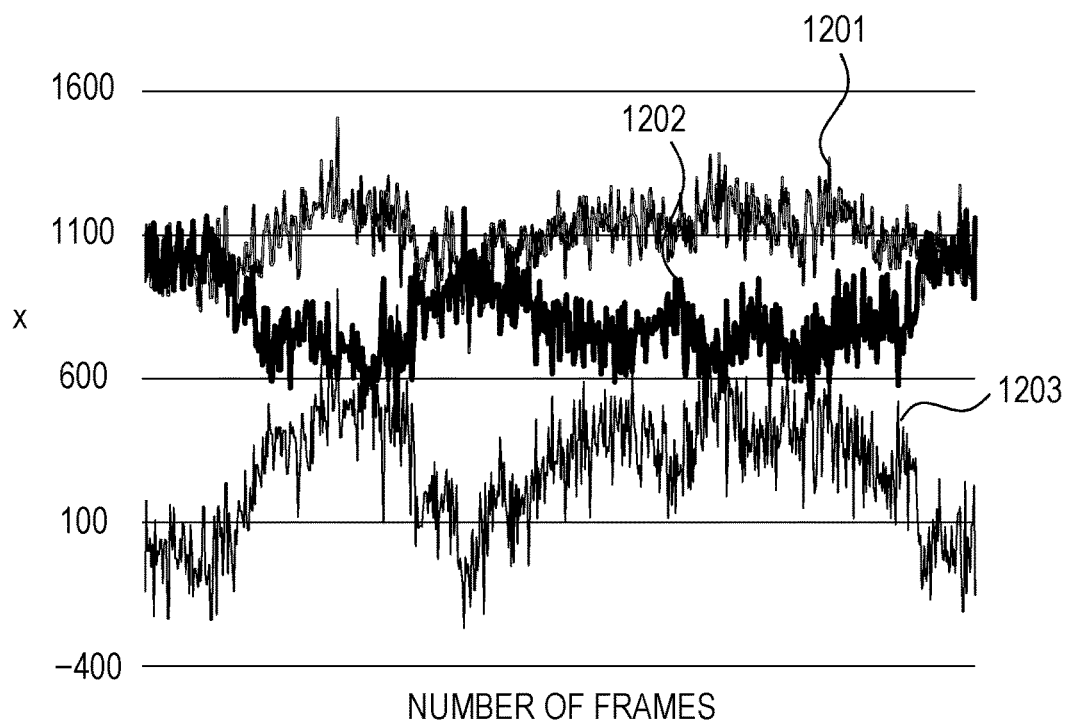
FIG. 12 is a diagram illustrating differences in line-of-sight data in a horizontal direction.

FIG. 12 illustrates an example of the difference in the line-of-sight data 921 between both eyes in the horizontal direction. The abscissa axis represents the number of frames and the ordinate axis represents the x coordinate of the line-of-sight position. A graph 1201 indicates changes in the x coordinate of the line-of-sight position of the left eye, a graph 1202 indicates changes in the x coordinate of the line-of-sight position of the right eye, and a graph 1203 indicates a difference between the graph 1201 and the graph 1202. It can be seen from the graph 1203 that the difference between the line-of-sight positions in the horizontal direction greatly changes due to congestion.

Figure 13:
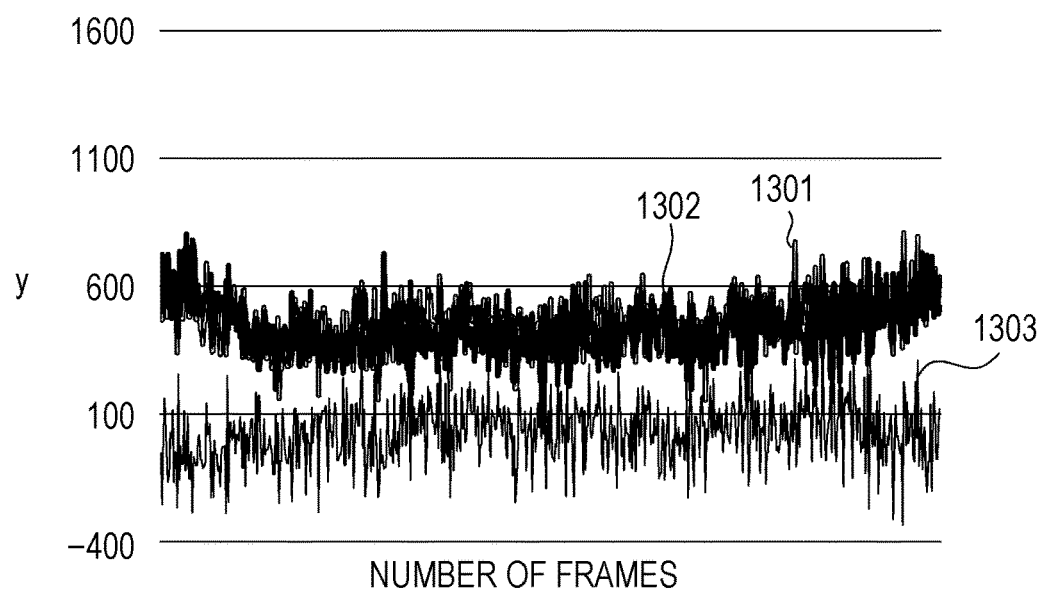
FIG. 13 is a diagram illustrating differences in line-of-sight data in a vertical direction.

FIG. 13 illustrates an example of the difference in the line-of-sight data 921 between both eyes in the vertical direction. The abscissa axis represents the number of frames and the ordinate axis represents the y coordinate of the line-of-sight position. A graph 1301 indicates changes in the y coordinate of the line-of-sight position of the left eye, a graph 1302 indicates changes in the y coordinate of the line-of-sight position of the right eye, and a graph 1303 indicates a difference between the graph 1301 and the graph 1302. It can be seen from the graph 1303 that changes in the difference between the line-of-sight positions in the vertical direction are smaller than changes in the difference therebetween in the horizontal direction and are not affected by congestion.

Therefore, the calculation unit 712 calculates a difference between the line-of-sight position in the vertical direction indicated by the line-of-sight data 921 of the left eye and the line-of-sight position in the vertical direction indicated by the line-of-sight data 921 of the right eye and calculates the index 923 based on this difference. For example, a change ΔLy in the line-of-sight position of the left eye in the vertical direction and a change ΔRy in the line-of-sight position of the right eye in the vertical direction are represented by the following formulas.

$$\Delta Ly = \Delta SLy + \Delta VLy \quad (3)$$

$$\Delta Ry = \Delta SRy + \Delta VRy \quad (4)$$

In formula (3), ΔSLy represents a large movement of the left eye in the vertical direction due to the saccade and ΔVLy represents a variation of the line-of-sight position of the left eye in the vertical direction. In formula (4), ΔSRy represents a large movement of the right eye in the vertical direction due to the saccade and ΔVRy represents a variation of the line-of-sight position of the right eye in the vertical direction. Since the left eye and the right eye are looking at positions at the same height, ΔSLy and ΔSRy can be regarded as almost the same value. Accordingly, the difference between ΔLy and ΔRy is as indicated by the following formula.

$$\Delta Ly - \Delta Ry = (\Delta SLy + \Delta VLy) - (\Delta SRy + \Delta VRy) = \Delta VLy - \Delta VRy \quad (5)$$

It can be seen from formula (5) that the variance of the difference Ly−Ry between the y coordinate Ly of the line-of-sight position of the left eye and the y coordinate Ry of the line-of-sight position of the right eye is represented as the sum of the variance caused by the variation of Ly and the variance caused by the variation of Ry. In addition, the variance caused by the variation of Ly and the variance caused by the variation of Ry can be regarded as almost the same value. Accordingly, it is possible to use half of the variance of Ly−Ry as the variance caused by the variation of Ly or the variance caused by the variation of Ry. Furthermore, the variance of the variation of the line-of-sight position in the horizontal direction can be regarded as almost the same value as the variance of the variation of the line-of-sight position in the vertical direction.

Figure 14:
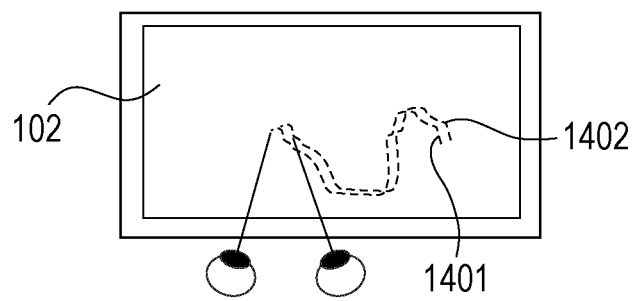
FIG. 14 is a diagram illustrating changes in line-of-sight positions of both eyes.

FIG. 14 illustrates an example of changes in the line-of-sight positions of both eyes. A line-of-sight position 1401 of the left eye and a line-of-sight position 1402 of the right eye of the observer looking at the screen 102 move on the screen 102 according to the position of an image being gazed.

Figure 15:
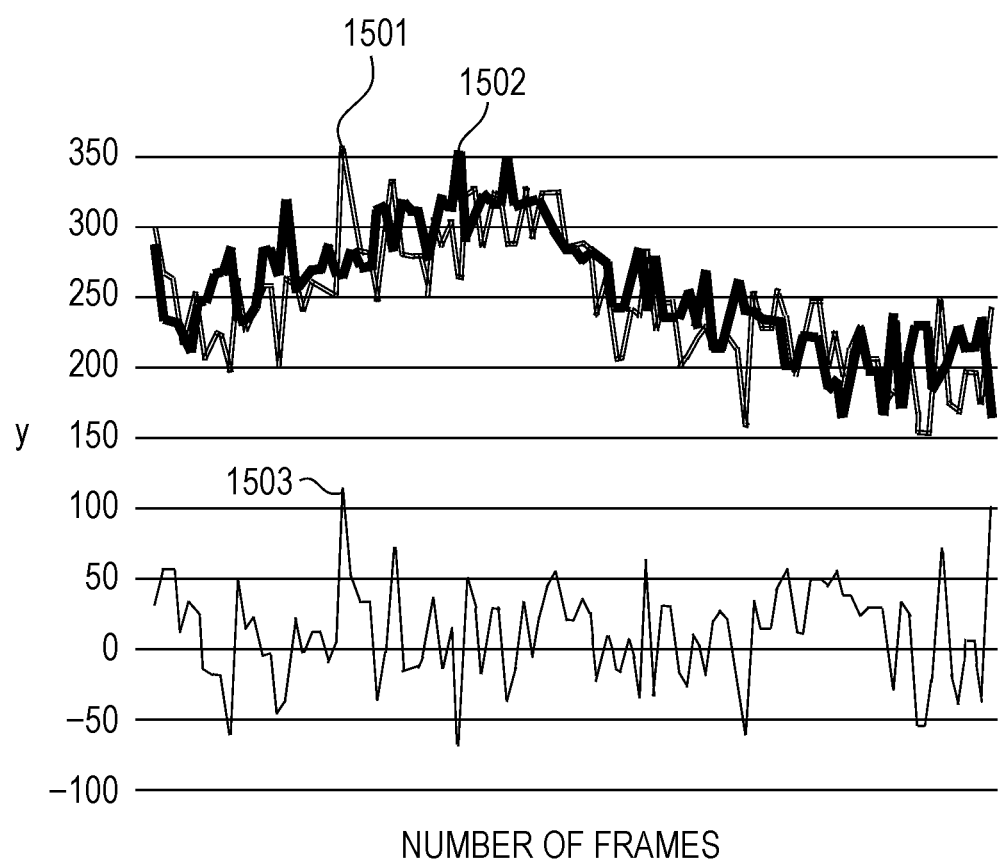
FIG. 15 is a diagram illustrating line-of-sight data corresponding to changes in line-of-sight positions of both eyes.

FIG. 15 illustrates an example of the line-of-sight data 921 corresponding to changes in the line-of-sight positions in FIG. 14. The abscissa axis represents the number of frames and the ordinate axis represents the y coordinate of the line-of-sight position. A graph 1501 indicates changes in the y coordinate of the line-of-sight position of the left eye, a graph 1502 indicates changes in the y coordinate of the line-of-sight position of the right eye, and a graph 1503 indicates a difference between the graph 1501 and the graph 1502.

By collecting the logs of the line-of-sight position 1401 and the line-of-sight position 1402 for a certain period and calculating a difference in the y coordinate between these line-of-sight positions, it becomes easier to regularly grasp the variation amount of the line-of-sight position even when the line of sight frequently moves. With this process, an appropriate threshold value for the determination on the stay may be resolved based on the variation amount of the line-of-sight position, whereby the accuracy of the determination on the stay is improved. For example, variance or standard deviation of the difference in the y coordinate between the line-of-sight positions detected during a certain period can be used as the index 923 indicating the variation of the line of sight.

Further, the difference between the line-of-sight data 921 of the left eye and the line-of-sight data 921 of the right eye is not restricted to the difference between the line-of-sight positions in the vertical direction and may be a difference between the line-of-sight positions in a predetermined direction intersecting the horizontal direction. For example, in a case where a straight line joining the eyeball of the left eye and the eyeball of the right eye in the left-right direction is not parallel to the x-axis on the screen 102, the y-axis on the screen 102 is not perpendicular to a straight line in the left-right direction but intersects therewith at a predetermined angle. In this case, the difference in the y coordinate between the line-of-sight positions of both eyes represents a difference between the line-of-sight positions in a predetermined direction intersecting the left-right direction.

Figure 16:
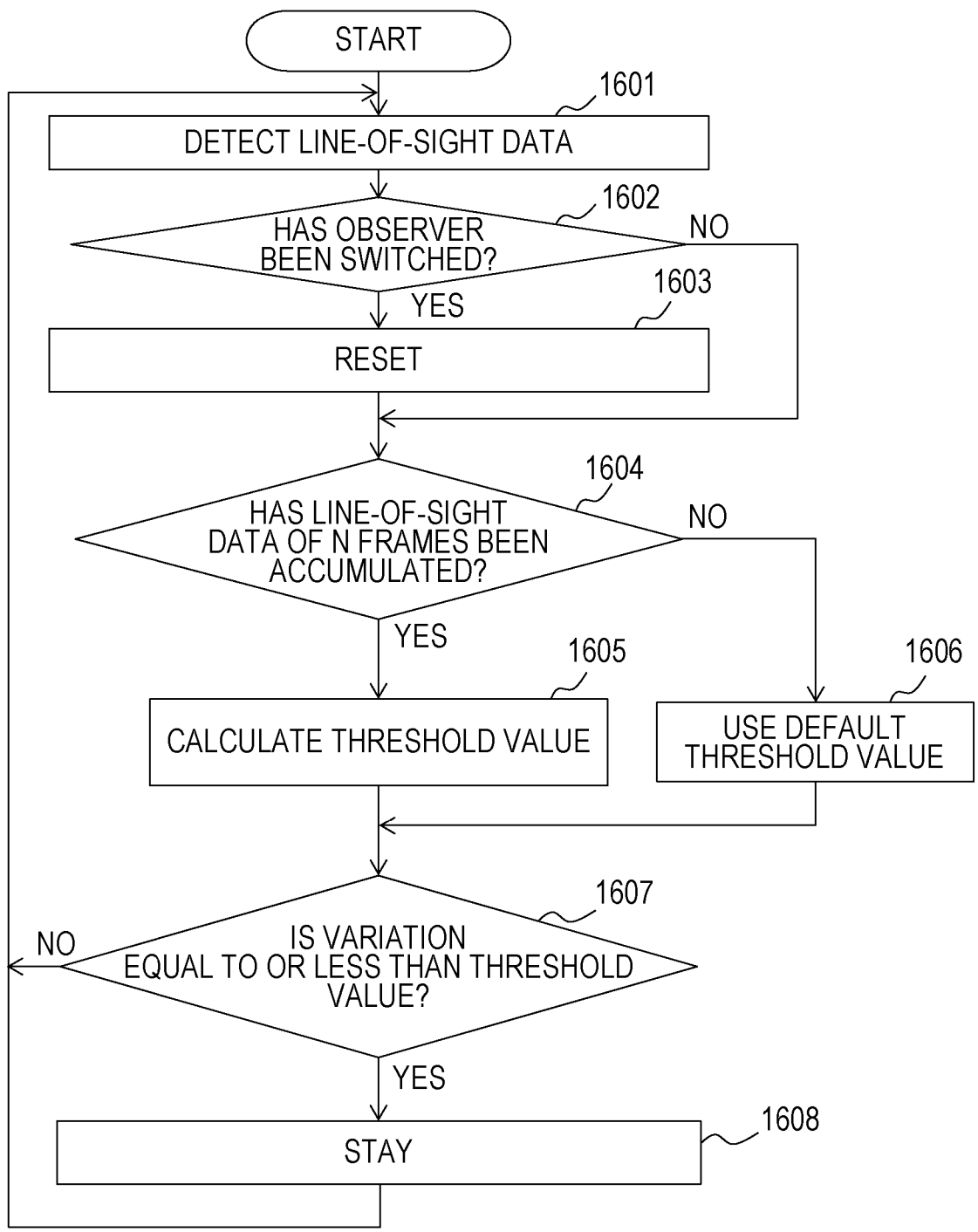
FIG. 16 is a flowchart illustrating a specific example of the line-of-sight detection process.

FIG. 16 is a flowchart illustrating a specific example of the line-of-sight detection process performed by the line-of-sight detection device 701 in FIG. 9. First, the detection unit 911 detects the line-of-sight data 921 of the observer's left eye and right eye from an image output by the camera 122 (step 1601).

For example, an x coordinate LXi of the line-of-sight position of the left eye, a y coordinate LYi of the line-of-sight position of the left eye, an x coordinate RXi of the line-of-sight position of the right eye, and a y coordinate RYi of the line-of-sight position of the right eye are detected from an image of an i-th frame. LXi, LYi, RXi, and RYi may be the coordinates of the line-of-sight positions on the screen 102 in FIG. 1 and may be the coordinates of the line-of-sight positions on the virtual plane set at a position where the object such as a commodity exists.

Next, the detection unit 911 checks whether the observer to be monitored has been switched to another observer (step 1602). For example, the detection unit 911 can determine that the observer has been switched when a new observer appears after the observer disappears from the video.

When the observer has been switched (YES in step 1602), the detection unit 911 resets the detection process by erasing the line-of-sight data 921 accumulated in the storage unit 711 (step 1603). Then, the detection unit 911 checks whether the line-of-sight data 921 of the latest N (N is an integer equal to or greater than two) frames has been accumulated in the storage unit 711 (step 1604).

In a case where the line-of-sight data 921 of the latest N frames has not been accumulated (NO in step 1604), the determination unit 713 uses the default threshold value as a threshold value TH for the determination on the stay (step 1606).

Next, the determination unit 713 calculates the variation 922 of the line-of-sight data at each of the plurality of time points within a predetermined period, from the line-of-sight data 921 of the left eye and the right eye detected at each time point and determines the stay for the variation 922 (step 1607).

For example, when the variance of the coordinates of the line-of-sight positions is used as the variation 922 of the line-of-sight data 921 detected from the i-th frame and the latest M (M is an integer equal to or greater than two) frames are used as the predetermined period, the determination unit 713 can calculate Vi representing the variation 922 by the following formulas.

$$Vi = ((LXi + RXi)/2 - Avex)^2 + ((LYi + RYi)/2 - Avey)^2 \quad (6)$$

$$Avex = \frac{1}{M}\Sigma^i_{j=i-M+1}(LXj+RXj)/2 \quad (7)$$

$$Avey = \frac{1}{M}\Sigma^i_{j=i-M+1}(LYj+RYj)/2 \quad (8)$$

In this case, it is assumed that M<N and i≥M are satisfied. For example, when the frame rate is 100 ms/frame, a value of about 5 to 20 may be used as N and a value equal to or greater than two and less than N may be used as M.

In formula (6), (LXi+RXi)/2 represents the average value of LXi and RXi and (LYi+RYi)/2 represents the average value of LYi and RYi. In formula (7), Avex represents a value obtained by averaging the average values of LXj and RXj over M frames in the range of j=i−M+1 to i. Further, Avey in formula (8) represents a value obtained by averaging the average values of LYj and RYj over the same M frames.

In the determination on the stay, the determination unit 713 compares the M variations Vj for the range of j=i−M+1 to i with the threshold value TH and, when Vj≤TH is satisfied for all instances of j (YES in step 1607), determines that the line of sight is staying (step 1608). In this case, the determination unit 713 calculates the line-of-sight position 925 from the coordinates of the line-of-sight positions of the M frames. Statistical values such as the average value and the median value of M coordinates can be used as the line-of-sight position 925. Then, the line-of-sight detection device 701 updates i by i=i+1 and repeats the processes in and after step 1601 for an image of the next frame.

On the other hand, when Vj>TH is satisfied for one or more instances of j (NO in step 1607), the determination unit 713 determines that the line of sight is not staying and the line-of-sight detection device 701 repeats the processes in and after step 1601 for an image of the next frame.

Further, when i<M is satisfied in step 1607, the determination unit 713 omits the determination on the stay and repeats the processes in and after step 1601. When the observer has not been switched in step 1602 (NO in step 1602), the detection unit 911 performs the process in step 1604.

When the line-of-sight data 921 of the latest N frames is accumulated (YES in step 1604), the calculation unit 712 calculates the index 923 using the accumulated line-of-sight data 921 and the determination unit 713 calculates the threshold value 924 from the index 923 (step 1605).

For example, the calculation unit 712 can use the moving average of the variance of the differences between LYi and RYi for the N frames, as the index 923. In this case, the calculation unit 712 calculates div representing the index 923 by the following formulas.

$$div = \frac{1}{N}\Sigma^i_{j=i-N+1}(RYj-LYj-ave)^2 \quad (9)$$

$$ave = \frac{1}{N}\Sigma^i_{j=i-N+1}(RYj-LYj) \quad (10)$$

In formula (10), ave represents the average value of RYi−LYi for the N frames in the range of j=i−N+1 to i and, in formula (9), div represents the variance of RYi−LYi for the same N frames. In this case, the determination unit 713 can calculate TH representing the threshold value 924 using a positive real number K by the following formula.

$$TH=K*(div/2) \quad (11)$$

Then, the determination unit 713 performs the processes in and after step 1607 using the threshold value TH in formula (11). Once the line-of-sight data 921 of the N frames are accumulated in step 1604, the threshold value TH calculated in step 1605 is used thereafter as long as the observer is not switched.

According to such a line-of-sight detection process, even when the frame rate of the video is low, an appropriate threshold value for the determination on the stay is resolved based on the difference in the line-of-sight data 921 between both eyes and the accuracy of the determination on the stay is improved.

Incidentally, Since the moving average of the variance of the differences between LYi and RYi is used as the index 923 in the line-of-sight detection process in FIG. 16, the period for the latest N frames is used as an accumulation period for accumulating the line-of-sight data 921. In the case of M<N, the period for the latest M frames used for calculating the variation Vi is included in the accumulation period. However, the accumulation period does not necessarily include the period for the M frames and may be a period preceding this period.

In addition, the determination unit 713 can also use the standard deviation instead of the variance of the coordinates of the line-of-sight positions, as the variation 922. In this case, the calculation unit 712 uses the standard deviation instead of the variance of the differences between LYi and RYi for the N frames to calculate the index 923.

The configuration of the line-of-sight detection device 701 in FIGS. 7 and 9 is merely an example and some constituent elements may be omitted or modified depending on the use or conditions of the line-of-sight detection device 701. For example, in the line-of-sight detection device 701 in FIG. 9, when the line-of-sight data 921 is detected by an external device, the detection unit 911 can be omitted.

The flowcharts illustrated in FIGS. 8 and 16 are merely examples and some processes may be omitted or modified depending on the configuration or conditions of the line-of-sight detection device 701. For example, in the line-of-sight detection process in FIG. 16, when the observer is supposed not to be switched, the processes in steps 1602 and 1603 can be omitted.

The line-of-sight sensor 103 in FIG. 1 and the line-of-sight detection illustrated in FIG. 10 are merely examples and the configuration and position of the line-of-sight sensor 103 change depending on the use or conditions of the line-of-sight detection device 701. When the camera 122 photographs the observer using visible light, the LED 121 can be omitted.

The line-of-sight data and the line-of-sight positions illustrated in FIGS. 2 to 6B and FIGS. 12 to 15 are merely examples and the line-of-sight data and the line-of-sight positions change depending on a video to be photographed. The congestion illustrated in FIG. 11 is merely an example and the degree of congestion changes depending on the observer.

Formulas (1) to (10) are merely examples and the line-of-sight detection device 701 may perform the line-of-sight detection process using other calculation formulas.

Figure 17:
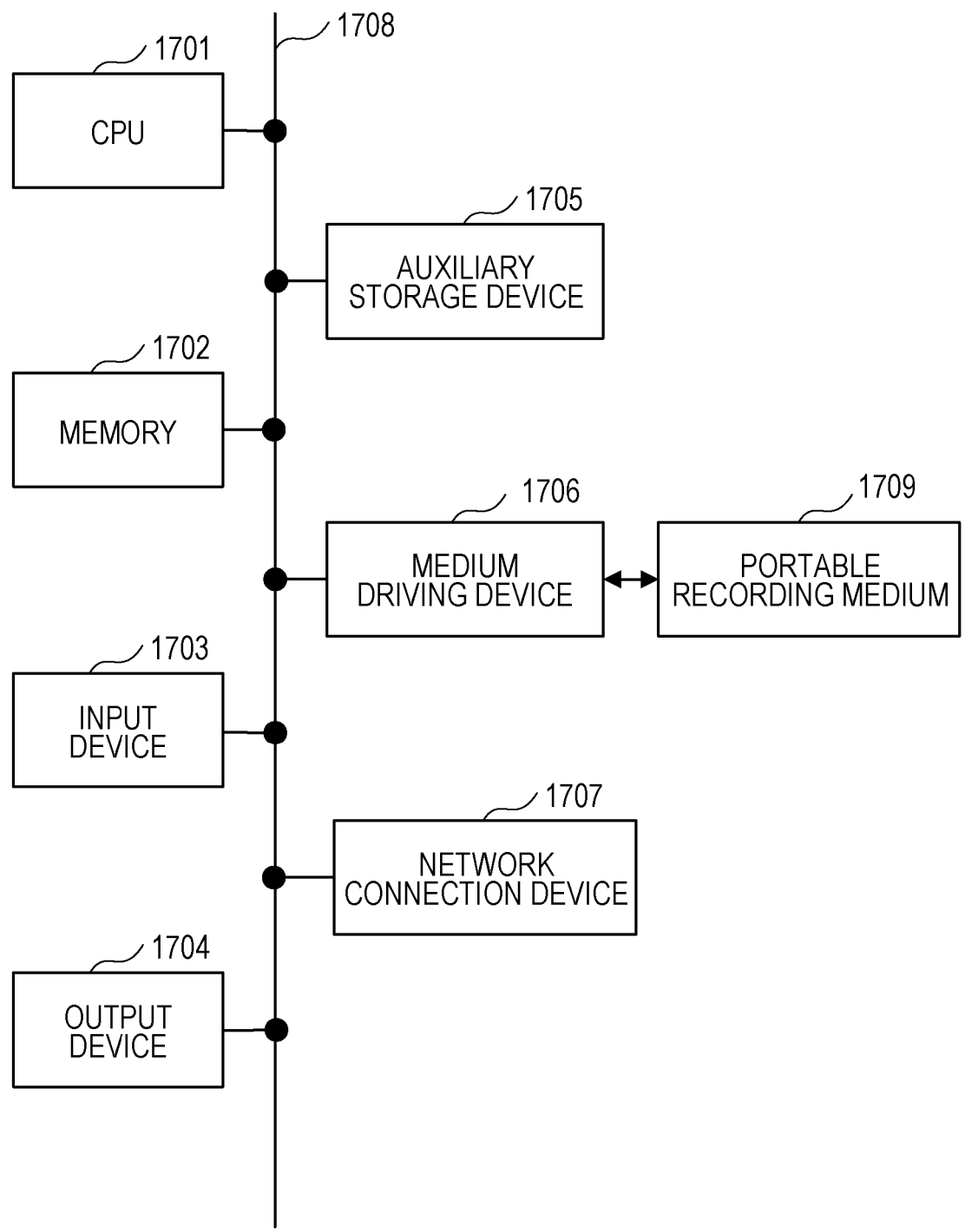
FIG. 17 is a configuration diagram of an information processing device.

FIG. 17 illustrates a configuration example of an information processing device (computer) used as the line-of-sight detection device 701 in FIGS. 7 and 9. The information processing device in FIG. 17 includes a central processing unit (CPU) 1701, a memory 1702, an input device 1703, an output device 1704, an auxiliary storage device 1705, a medium driving device 1706, and a network connection device 1707. These constituent elements are coupled to each other by a bus 1708. The camera 901 in FIG. 9 may be coupled to the bus 1708.

The memory 1702 is, for example, a semiconductor memory such as a read only memory (ROM), a random access memory (RAM), or a flash memory and stores programs and data used for processes. The memory 1702 can be used as the storage unit 711 in FIGS. 7 and 9.

The CPU 1701 (processor) operates as the calculation unit 712 and the determination unit 713 in FIGS. 7 and 9, for example, by executing a program using the memory 1702. The CPU 1701 also operates as the detection unit 911 in FIG. 9 by executing a program using the memory 1702.

The input device 1703 is, for example, a touch panel, a keyboard, a pointing device or the like and is used for inputting instructions and information from a user or an operator. The output device 1704 is, for example, a display device, a printer, a speaker or the like and is used for making an inquiry to the user or the operator and outputting a processing result. The output device 1704 can be used as the output unit 912 in FIG. 9.

The auxiliary storage device 1705 is, for example, a magnetic disk device, an optical disc device, a magneto-optical disk device, a tape device or the like. The auxiliary storage device 1705 may be a hard disk drive. The information processing device can save programs and data in the auxiliary storage device 1705 and load these programs and data into the memory 1702 to use. The auxiliary storage device 1705 can be used as the storage unit 711 in FIGS. 7 and 9.

The medium driving device 1706 drives a portable recording medium 1709 and accesses recorded contents thereof. The portable recording medium 1709 is a memory device, a flexible disk, an optical disc, a magneto-optical disk, or the like. The portable recording medium 1709 may be a compact disk read only memory (CD-ROM), a digital versatile disk (DVD), or a universal serial bus (USB) memory. The user or the operator can save programs and data in this portable recording medium 1709 and load these programs and data into the memory 1702 to use.

As described above, a computer-readable recording medium in which the programs and data used for processes are saved includes a physical (non-transitory) recording medium such as the memory 1702, the auxiliary storage device 1705, and the portable recording medium 1709.

The network connection device 1707 is a communication interface circuit that is coupled to a communication network such as a local area network (LAN) and the Internet and performs data conversion involved in communication. The information processing device can receive programs and data from an external device via the network connection device 1707 and load these programs and data into the memory 1702 to use. The network connection device 1707 can be used as the output unit 912 in FIG. 9.

Further, t is not necessary for the information processing device to include all the constituent elements in FIG. 17 and some constituent elements may be omitted depending on the use or the condition. For example, when an interface with the user or the operator is unnecessary, the input device 1703 and the output device 1704 may be omitted. In addition, when the information processing device does not use the portable recording medium 1709 or the communication network, the medium driving device 1706 or the network connection device 1707 may be omitted.

While the disclosed embodiments and the advantages thereof have been described in detail, those skilled in the art will be able to make various modifications, additions, and omissions without departing from the scope of the invention as explicitly set forth in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a line of sight detection program for causing a computer to execute a process, the process comprising:

finding an index indicating a variation of a line of sight of an observer who observes an object, based on a difference between line of sight data of a left eye of the observer and line of sight data of a right eye of the observer;

determining a stay of the line of sight of the observer based on the index; and resolving a line of sight position of the observer based on a result of the determination on the stay.

2. The non-transitory computer-readable recording medium according to claim 1, wherein the difference represents a difference between a line of sight position of the left eye and a line of sight position of the right eye in a predetermined direction which intersects a left-right direction in a plane opposing a face of the observer.

3. The non-transitory computer-readable recording medium according to claim 2, wherein the predetermined direction is a direction perpendicular to the left-right direction.

4. The non-transitory computer-readable recording medium according to claim 1, wherein the computer calculates a threshold value for the determination on the stay, based on the index, calculates, from the line of sight data of the left eye and the right eye detected at each of a plurality of time points within a predetermined period, a variation of the line of sight data at each of a plurality of time points, and determines that the line of sight of the observer is staying when the variation of the line of sight data at each of the plurality of time points is smaller than the threshold value.

5. The non-transitory computer-readable recording medium according to claim 4, wherein the index represents variance or standard deviation of the differences detected at each of a plurality of time points within a first period including the predetermined period or a second period before the predetermined period.

6. An information processing apparatus comprising:

a memory configured to store line of sight data of a left eye of an observer who observes an object and line of sight data of a right eye of the observer; and a processor coupled a memory and configured to perform operations of:

finding an index indicating a variation of a line of sight of the observer, based on a difference between the line of sight data of the left eye and the line of sight data of the right eye; and determining a stay of the line of sight of the observer based on the index; and resolving a line of sight position of the observer based on a result of the determination on the stay.

7. The information processing apparatus according to claim 6, wherein the difference represents a difference between a line of sight position of the left eye and a line of sight position of the right eye in a predetermined direction which intersects a left-right direction in a plane opposing a face of the observer.

8. The information processing apparatus according to claim 7, wherein the predetermined direction is a direction perpendicular to the left-right direction.

9. The information processing apparatus according to claim 6, wherein the processor calculates a threshold value for the determination on the stay, based on the index, calculates, from the line of sight data of the left eye and the right eye detected at each of a plurality of time points within a predetermined period, a variation of the line of sight data at each of a plurality of time points, and determines that the line of sight of the observer is staying when the variation of the line of sight data at each of the plurality of time points is smaller than the threshold value.

10. The information processing apparatus according to claim 9, wherein the index represents variance or standard deviation of the differences detected at each of a plurality of time points within a first period including the predetermined period or a second period before the predetermined period.

11. A line of sight detection method comprising:

finding, by a computer, an index indicating a variation of a line of sight of an observer who observes an object, based on a difference between line of sight data of a left eye of the observer and line of sight data of a right eye of the observer;

determining a stay of the line of sight of the observer based on the index; and resolving a line of sight position of the observer based on a result of the determination on the stay.

12. The line of sight detection method according to claim 11, wherein the difference represents a difference between a line of sight position of the left eye and a line of sight position of the right eye in a predetermined direction which intersects a left-right direction in a plane opposing a face of the observer.

13. The line of sight detection method according to claim 12, wherein the predetermined direction is a direction perpendicular to the left-right direction.

14. The line of sight detection method according to claim 11, wherein the computer calculates a threshold value for the determination on the stay, based on the index, calculates, from the line of sight data of the left eye and the right eye detected at each of a plurality of time points within a predetermined period, a variation of the line of sight data at each of a plurality of time points, and determines that the line of sight of the observer is staying when the variation of the line of sight data at each of the plurality of time points is smaller than the threshold value.

15. The line of sight detection method according to claim 14, wherein the index represents variance or standard deviation of the differences detected at each of a plurality of time points within a first period including the predetermined period or a second period before the predetermined period.

* * * * *